(No Model.)
E. DIENST.
HARMONICA.
No. 501,495. Patented July 18, 1893.
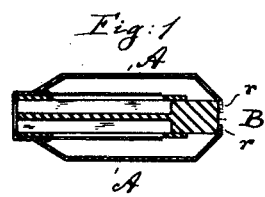
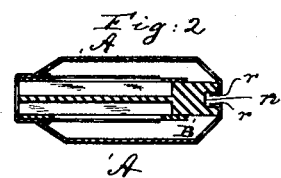
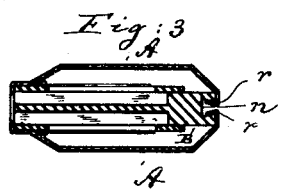
Witnesses:
A. Jonghmans
Wm. Schulz
Inventor:
E. Dienst, per
Roeder & Briesen
attys.

United States Patent Office.

EDUARD DIENST, OF LEIPSIC-GOHLIS, GERMANY.

HARMONICA.

SPECIFICATION forming part of Letters Patent No. 501,495, dated July 18, 1893.

Application filed March 14, 1893. Serial No. 465,883. (No model.)

*To all whom it may concern:*

Be it known that I, EDUARD DIENST, of Leipsic-Gohlis, in the Kingdom of Saxony, Germany, have invented a new and useful Improvement in Harmonicas, of which the following is a specification.

This invention relates to a harmonica having a removable spring cover, so that the same cover may be applied to different instruments. The form and construction of the cover is such that when slipped over a harmonica, it will become securely attached without additional mechanism.

In the accompanying drawings: Figure 1 is a cross section of my improved harmonica. Figs. 2 and 3 are cross sections of modifications.

The letter A, represents the cover of a harmonica and B, is the box containing the wind chest and reeds. The cover A, is made of one continuous piece of elastic material and is substantially of U-shape in cross section. Thus the cover extends over the two sides and the front of the box B. At the back the cover A, is provided with flanges $r$, between which a slit is formed, to permit the cover to tightly embrace the inclosed box by its spring action.

In Fig. 2, a groove $n$, is formed in the box B, and the flanges $r$, are bent inward to engage the groove.

In Fig. 3, the groove $n$, is made of dovetail form and the flanges $r$ are shaped correspondingly.

In use, the cover is slipped over the box and will be held in place by its own spring pressure. To remove the cover, it is only necessary to slide it off the box. Of course, the cover may be provided with any suitable ornamentation.

What I claim is—

1. A harmonica composed of a box B and of a removable U-shaped spring cover that embraces the box, substantially as specified.

2. A harmonica composed of a grooved box and of a removable U-shaped spring cover that embraces the box and has inwardly turned flanges that engage the groove, substantially as specified.

In testimony whereof I have signed my name to this specification in the presence of two subscribing witnesses.

EDUARD DIENST.

Witnesses:
 MAX MATTHAR,
 CARL BORNGRAEBER.